(12) United States Patent
Kunde

(10) Patent No.: US 10,860,823 B2
(45) Date of Patent: Dec. 8, 2020

(54) SCAN CRUTCH

(71) Applicant: PADRES L.P., San Diego, CA (US)

(72) Inventor: Gabriel Kunde, San Diego, CA (US)

(73) Assignee: PADRES L.P., San Diego, CA (US)

( * ) Notice: Subject to any disclaimer, the term of this patent is extended or adjusted under 35 U.S.C. 154(b) by 56 days.

(21) Appl. No.: 16/286,994

(22) Filed: Feb. 27, 2019

(65) Prior Publication Data

US 2019/0347456 A1 Nov. 14, 2019

Related U.S. Application Data

(60) Provisional application No. 62/671,386, filed on May 14, 2018.

(51) Int. Cl.
*G06K 7/10* (2006.01)

(52) U.S. Cl.
CPC ..... *G06K 7/10881* (2013.01); *G06K 7/10792* (2013.01)

(58) Field of Classification Search
CPC ............... G06K 7/10792; G06K 7/10881
USPC ........................................ 235/472.01
See application file for complete search history.

(56) References Cited

U.S. PATENT DOCUMENTS

| D348,664 S | 7/1994 | Imazeki |
| D413,860 S | 9/1999 | Matthews |
| D490,002 S | 5/2004 | Sanchez |
| D582,073 S | 12/2008 | Yang |
| D624,445 S | 9/2010 | Heckhausen |
| D649,140 S | 11/2011 | Spatter |
| D652,026 S | 1/2012 | Yukimoto |
| D663,634 S | 7/2012 | Townsend |
| D754,663 S | 4/2016 | Graves |
| 9,665,760 B1 * | 5/2017 | Lei ........................ G06K 7/1478 |
| D837,077 S | 1/2019 | Narsimhan |
| D847,758 S | 5/2019 | Chadbourne |
| D848,954 S | 5/2019 | Chadbourne |
| 2006/0184243 A1 * | 8/2006 | Yilmaz ................... A61F 2/148 |
| | | 623/4.1 |
| 2007/0126644 A1 | 6/2007 | Kim |
| 2017/0317397 A1 | 11/2017 | Faraone |
| 2019/0123428 A1 | 4/2019 | Packer |

\* cited by examiner

*Primary Examiner* — Toan C Ly

(74) *Attorney, Agent, or Firm* — Lewis Roca Rothgerber Christie LLP

(57) ABSTRACT

A scanning system is providing including a scanner and a scan crutch. The scanner includes a housing, a window in an upper end of the housing, and a light emitter/receiver in the housing under the window. The scan crutch is attached to the scanner and includes a base and a protrusion extending from the base in a direction away from the scanner. The protrusion of the scan crutch ensures accurate and repeatable scanning of target objects by allowing a user to quickly position the scanner at an optimum distance from a target object by contacting the target object with the protrusion of the scan crutch.

17 Claims, 6 Drawing Sheets

SCAN CRUTCH

CROSS-REFERENCE TO RELATED APPLICATION

This application claims priority to and the benefit of U.S. Provisional Patent Application Ser. No. 62/671,386, filed on May 14, 2018, the entire disclosure of which is incorporated herein by reference.

BACKGROUND

1. Field

Aspects of example embodiments of the present invention relate a crutch (e.g., a scanner crutch or a scan crutch) that ensures proper spacing between a scanner (e.g., an electronic scanner or a barcode scanner) and a target object.

2. Related Art

Recently, electronic scanners (e.g., barcode scanners) have been increasingly used at sporting events, concerts, airline boarding queues, and the like to scan tickets to permit entrance by the ticket holder to the venue, airplane, and the like. Such tickets generally include barcodes, such as traditional one-dimensional barcodes or the more recently-developed two-dimensional barcodes (e.g., QR-codes). Each ticket may have a unique barcode that is designed to be scanned by the electronic scanner.

Generally, electronic scanners configured to scan barcodes include a light emission source, such as a light emitting diode (LED), that emits light and a sensor, such as an optical sensor (e.g., a camera), such as a charge-coupled device (CCD) or a CMOS (complementary metal-oxide semiconductor) sensor, configured to detect the light reflected from the barcode. To scan a barcode, the electronic scanner is positioned such that the light emission source faces the barcode, light is emitted by the light emission source toward the barcode, and the light reflected from the barcode and surrounding area is received by the sensor. Darker areas of the barcode will absorb some or most of the emitted light while surrounding lighter areas, such as white space, will reflect most of the emitted light. Thus, the reflected light will correspond to the scanned barcode. The sensor or another device then decodes the reflected light into a useful format that can be interpreted by another system, computer, or individual.

In some cases, the electronic scanner may have a wireless network function that allows it to be wirelessly connected to a network, such as the Internet or an internal venue-specific network (e.g., a local area network or LAN), to upload the ticket information (e.g., the scanned barcode information) in real-time.

By employing such electronic scanners, a venue can more easily track visitors, such as a number of visitors, prevent fraud, such as by ensuring a ticket is not scanned more than once to gain entry to the venue, and allow visitors to retain the original ticket as souvenirs.

However, electronic ticket scanning may cause slowdowns at entrances to venues as the scanners may not quickly scan the tickets. For example, it has been contemplated that attempting to scan tickets in a relatively dark environment, such as when the ticket is scanned in a shaded area on an otherwise bright day, or when a ticket is electronic and displayed on a visitor's personal electronic device and the display's contrast setting is relatively low, may impede or delay the electronic scanner's ability to quickly recognize the barcode on the ticket.

As venues continue to grow in size, ensuring quick and orderly admittance of visitors to venues is increasingly important, along with accurate ticket tracking provided by electronic ticket scanning. Therefore, there is a desire to ensure quick and accurate scanning of tickets by electronic devices.

SUMMARY

The present disclosure is directed toward various embodiments of a scan crutch (e.g., a spacer) that improves scanning performance of an electronic scanner by ensuring accurate positioning of the electronic scanner with respect to a scan target (e.g., a barcode).

According to one embodiment of the present invention, a scan crutch includes: a base having a planar surface; a protrusion extending from the planar surface of the base in a first direction to a distance from the base; and an attachment member extending from the base in a second direction different from the first direction and having an open rectangular shape.

The base may include a first planar base portion and a second planar base portion oriented at a right angle to the first planar base portion. The protrusion may extend from the first planar base portion, and the attachment member may extend from the second planar base portion.

The second planar base portion may be at one edge of the open rectangular shape formed by the attachment member, and the protrusion may be at the one edge of and offset from a center of the open rectangular shape formed by the attachment member.

According to another embodiment of the present invention, a scanning system includes: a scanner and a scan crutch attached to the scanner. The scanner includes a housing, a window in an upper end of the housing, and a light emitter/receiver in the housing under the window. The scan crutch includes: a base on the upper end of the housing adjacent the window; a first protrusion extending from an upper surface of the base in a first direction away from the scanner; and a second protrusion extending from a lower surface of the base in a second direction toward the scanner. The second direction is opposite the first direction, and the third direction is perpendicular to the first and second directions. The second protrusion has a smaller width or diameter in a third direction than the base.

The first protrusion may be offset from the second protrusion in the third direction.

The first protrusion may be nearer to a center of the scanner than the second protrusion is.

The scanner may further include a slot open to the upper end of the housing adjacent the window and extending in the second direction. The second protrusion may be in the slot.

The base may include a planar base portion and a sidewall extending from an edge of the planar base portion, and the first and second protrusions may respectively extend from upper and lower surfaces of the planar base portion.

Both the first and second directions may be normal to the upper surface of the planar base portion, and the sidewall may extend from the planar base portion in the second direction toward the scanner.

The sidewall of the base may contact a side surface of the scanner.

The sidewall may extend from a plurality of edges of the planar base portion and may contact a corner of the scanner.

The base may include a planar base portion and a sidewall extending from an edge of the planar base portion. The first protrusion may extend from an upper surface of the planar base portion, and the second protrusion may extend from the sidewall in the second direction.

The sidewall may extend along an entire edge of the planar base portion in the third direction.

A distal end of the sidewall in the second direction may extend beyond a proximal end of the second protrusion in the second direction.

According to another embodiment of the present invention, method of scanning a target object by using a scanner and a scan crutch is provided. The scanner includes a housing, a window in an upper end of the housing, and a light emitter/receiver in the housing and under the window, and the scan crutch includes a base and a protrusion extending from the base. The method includes: attaching the scan crutch to the scanner such that the base contacts the upper end of the housing adjacent the window; orienting the scanner over the target object such that the window faces the target object; and moving the scanner and the scan crutch toward the target object such that a distal end of the protrusion contacts the target object.

The method may further include activating a scanning function of the scanner when the distal end of the protrusion contacts the target object.

The attaching of the scan crutch to the scanner may include inserting a second protrusion of the scan crutch into a slot in the scanner.

The method may further include removing a stylus from the slot of the scanner before the attaching of the scan crutch to the scanner.

The moving of the scanner and the scan crutch may include positioning the distal end of the protrusion into a dimple in the target object.

The attaching of the scan crutch to the scanner may further include rotating the scan crutch relative to the scanner such that a sidewall protruding from the base toward the scanner contacts a side surface of the housing adjacent the upper end of the housing.

This summary is provided to introduce a selection of features and concepts of example embodiments of the present invention that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more example embodiments to provide a workable device.

DETAILED DESCRIPTION

Figure 1A:
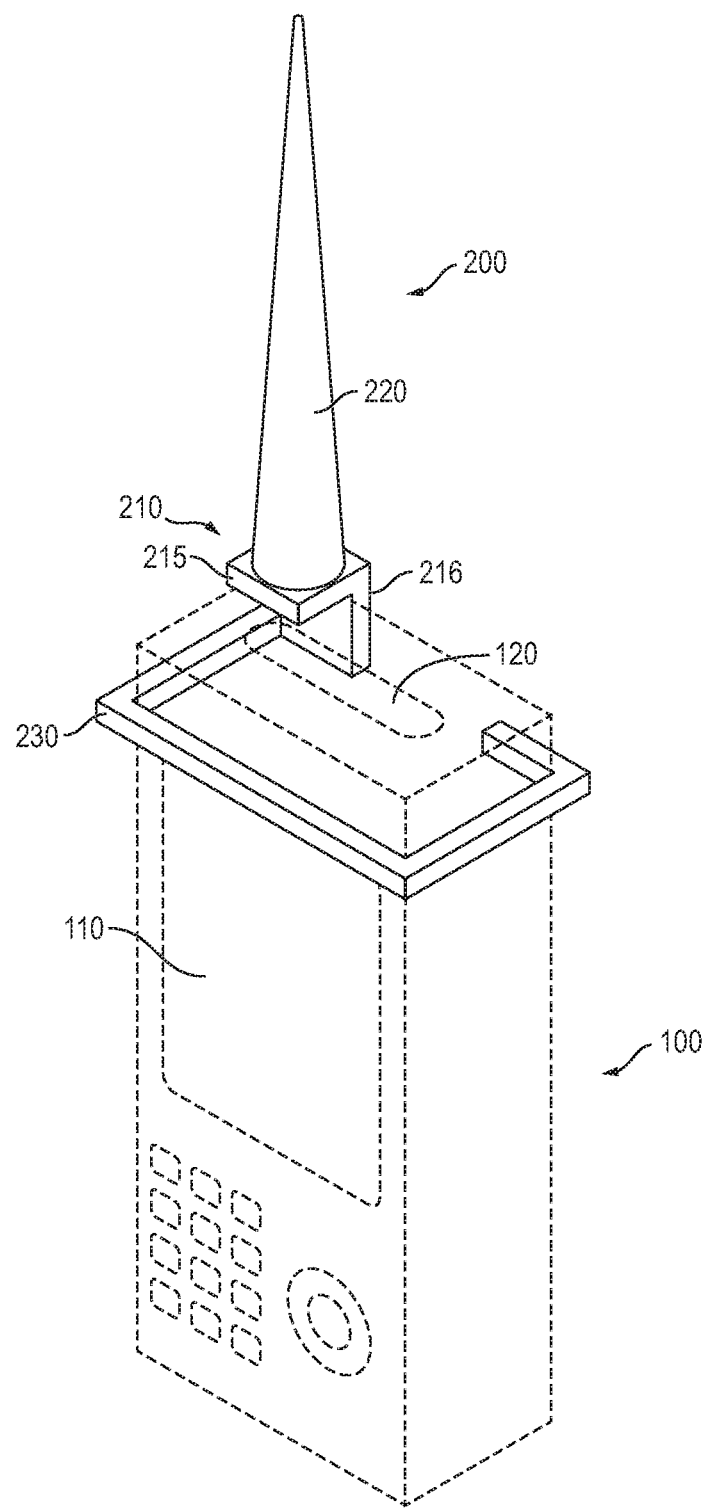
FIG. 1A is a perspective view of a first embodiment of a scan crutch attached to a scanner.

The present disclosure is directed toward various example embodiments of a scan crutch that is configured to be attached to a scanner, such as an electronic ticket scanner, and includes a protrusion to ensure proper spacing between the scanner and a target object, such as a barcode on a ticket. In use, a user may attach the scan crutch to the scanner such that the protrusion extends away from the scanner. Then, the user places the scanner with the scan crutch attached thereto over a target object, moves the scanner toward the target object until the protrusion of the scan crutch contacts the target object or an area adjacent the target object, and then activates the scan function of the scanner. In some embodiments, the scanner may continuously scan for the target object such that the user does not need to active the scan function each time. Thus, proper positioning of the scanner with respect to the target object, for example, proper spacing of the scanner from the target object, is quickly achieved and is easily repeatable, allowing for more rapid and reliable ticket scanning.

Hereinafter, example embodiments of the present invention will be described, in more detail, with reference to the accompanying drawings. The present invention, however, may be embodied in various different forms and should not be construed as being limited to only the embodiments illustrated herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section described below could be termed a second element, component, region, layer, or section, without departing from the spirit and scope of the present invention.

It will be understood that when an element is referred to as being "connected to" or "coupled to" another element, it can be directly connected to or coupled to the other element, or one or more intervening elements may be present. It will also be understood that when an element is referred to as being "between" two elements, it can be the only element between the two elements, or one or more intervening elements may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "include," "includes," and "including," when used in this specification, specify the presence of the stated features, integers, steps, operations, elements, and/or components but do not preclude the presence or addition of one or more other features, integers, steps, operations, elements, components, and/or groups thereof. That is, the processes and methods described herein are not limited to the operations indicated and may include additional operations or may omit some operations, and the order of the operations may vary according to some embodiments. As used herein, the term "and/or" includes any and all combinations of one or more of the associated listed items. Expressions, such as "at least one of," when preceding a list of elements, modify the entire list of elements and do not modify the individual elements of the list.

As used herein, the terms "substantially," "about," and similar terms are used as terms of approximation and not as terms of degree and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification and should not be interpreted in an idealized or overly formal sense unless expressly so defined herein.

Figure 1B:
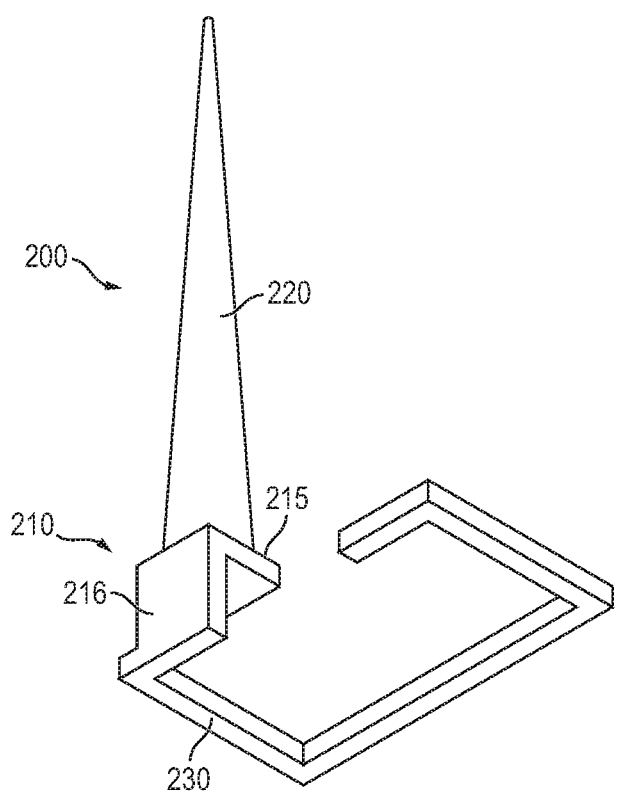
FIG. 1B is another perspective view of the first embodiment of the scan crutch.

FIG. 1A shows a first embodiment of a scan crutch 200 attached to a scanner 100, and FIG. 1B shows another view of the scan crutch 200. In FIG. 1A, the scanner 100 is shown as being a handheld or palmtop computer, such as a Personal Digital Assistant (PDA), including a display screen 110 (e.g., a display panel) and a window 120 (e.g., a barcode scanner emitter/receiver window). However, the present invention is not limited to the scanner 100 being a handheld or palmtop computer and can be, as other examples, a fixed scanner where the target object is moved within a scan area of the scanner, or any device which benefits from being quickly and accurately spaced from a target object.

In some embodiments, the scanner 100 may include the above-described light emission source, such as the light emitting diode (LED), and a sensor (e.g., an optical sensor), such as the charge-coupled device (CCD) or the complementary metal-oxide semiconductor (CMOS) sensor, configured to detect the light emitted by the light emission source as it is reflected from a target object. The sensor may be in a housing and under the window 120. The window 120 may be transparent to allow the emitted and reflected light to pass therethrough.

The scan crutch 200 shown in FIGS. 1A and 1B includes a base 210 including first and second planar base portions 215 and 216, a protrusion 220 extending from the base 210, and an attachment member 230 extending from the base 210. The base 210 is formed by the first and second planar base portions 215 and 216. For example, the first planar base portion 215 and the second planar base portion 216 may be oriented at about 90° with respect to each other. That is, a planar surface of the first planar base portion 215 may face (or may contact) an upper surface of the scanner 100 adjacent to the window 120, and the second planar base portion 216 may extend from an edge of the first planar base portion 215 at about a right angle to face (or contact) a side surface of the scanner 100.

As can be seen in FIGS. 1A and 1B, the attachment member 230 extends from an edge of the second planar base portion 216 around or substantially around a peripheral surface of the scanner 100. For example, in the embodiment shown in FIGS. 1A and 1B, the attachment member 230 has an open rectangular shape configured to fit around the peripheral surface of the scanner 100. The attachment member 230 may be sized to fit a particular scanner or may be sized relatively small but flexible such that it expands to tightly fit around the scanner 100. The attachment member 230 may rest on a protruding feature of the scanner 100, for example, a battery pack or the like. The attachment member 230 may be configured to come to rest on the scanner 100 at an area between an upper end of the scanner 100 at where the window 120 is arranged and the display screen 110 to avoid interfering with operation of the scanner 100. In some embodiments, the attachment member 230 may have a closed rectangular shape with the distal end thereof contacting another edge of the second planar base portion 216. Also, the attachment member 230 is not limited to a rectangular or substantially rectangular shape and may have any suitable shape to fit around a scanner. In addition, the attachment member may be rigid or flexible and may be coated with a non-stick material to increase friction against the scanner.

Together, the first and second planar base portions 215 and 216 and the attachment member 230 ensure a secure connection between the scan crutch 200 and the scanner 100. For example, the first planar base portion 215 and the attachment member 230 secure the scan crutch 200 to the scanner 100 in a vertical direction (e.g., a scanning direction), and the second planar base portion 216 and the attachment member 230 secure or prevent rotation and/or lateral movement of the scan crutch 200 relative to the scanner 100.

The protrusion 220 extends from an upper surface of the first planar base portion 215 in a direction away from the scanner 100. For example, the protrusion 220 may extend in the same or substantially the same direction as the light emitted from the window 120 propagates. The protrusion 220 and the base 210 are offset from the window 120 so they do not cover the window 120. The protrusion 220 may have any suitable cross-sectional shape, such as cylindrical, rectangular, pyramidal, etc., and may have a constant diameter or width or a decreasing diameter or width as it extends from the base 210.

The protrusion 220 may have a length (or height) corresponding to an optimum scanning distance for the scanner 100. The optimum scanning distance may vary between different scanners, and the protrusion 220 may be sized according to the kind of scanner (or type of sensor included in the scanner) to which it is to be attached. Generally, barcode scanners may reliably scan a barcode that is between a few inches to a few feet away from the scanner. However, an optimum scanning distance may be much smaller and may be, for example, between three and five inches. In this case, the protrusion 220 may be about four inches long such that, when the scanner 100 with the scan crutch 200 is used, the scanner 100 is reliably and repeatedly positioned about four inches away from a target object. However, the present invention is not limited thereto, and the protrusion 220 may have any suitable length as would be understood by one of ordinary skill in the art.

Although the protrusion 220 is shown as coming to a point (e.g., a distal end or tip of the protrusion 220 is shown as coming to a point) in FIGS. 1A and 1B, the present invention is not limited thereto. In other embodiments, a distal end of the protrusion 220 may be rounded, flat, curved, or otherwise suitably shaped to contact a target object. For example, a target object may have a dimple formed therein into which the distal end of the protrusion 220 fits. Thus, in use, the user may be able to quickly and repeatedly position the scanner 100 over the target object by placing the distal end of the protrusion 220 into the dimple in the target object.

Figure 2A:
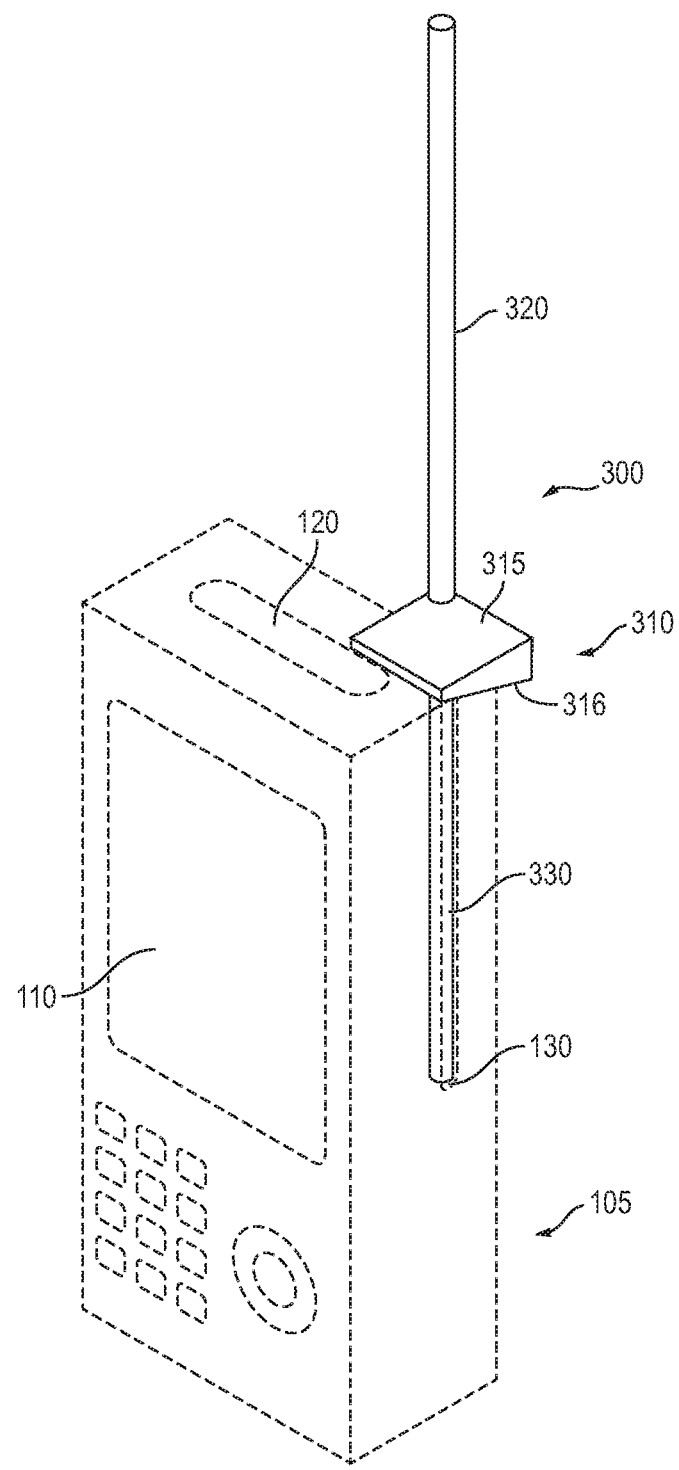
FIG. 2A is a perspective view of a second embodiment of a scan crutch attached to a scanner.
Figure 2B:
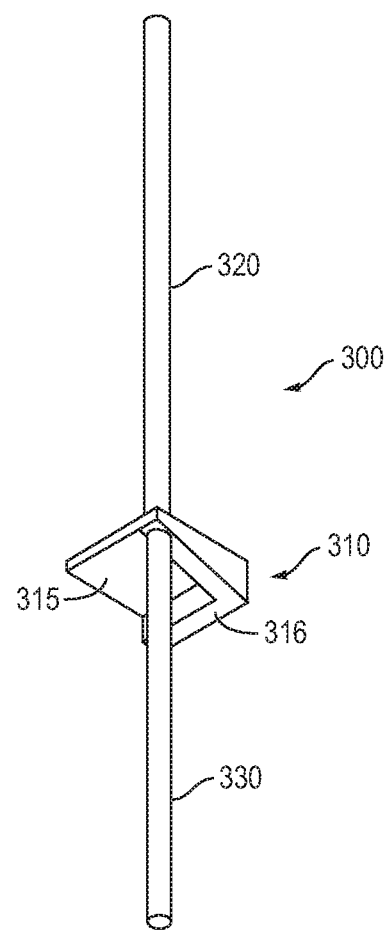
FIG. 2B is another perspective view of the second embodiment of the scan crutch.

FIG. 2A shows a second embodiment of a scan crutch 300 attached to a scanner 105, and FIG. 2B shows another view of the scan crutch 300. Different from the scanner 100 shown in FIG. 1A, the scanner 105 shown in FIG. 2A further includes a slot 130. The slot 130 extends from an upper surface of the scanner 105 at where the window 120 is positioned. The slot 130 may be a slot where, for example, a stylus or pointer is stored in the scanner 105 when not in use.

The scan crutch 300 shown in FIGS. 2A and 2B includes a base 310, a first protrusion 320 extending from the base 310 in a first direction (e.g., in an emission direction of the scanner 105 through the window 120), and a second protrusion 320 extending from the base 310 in a second direction. The first and second directions may be opposite to each other (e.g., may be offset from each other by about 180°), but the present invention is not limited thereto.

The first protrusion 320 may be similar to the protrusion 220 shown in FIGS. 1A and 1B. For example, the first protrusion 320 and the protrusion 220 may have the same or substantially the same length (or height) and the same or substantially the same tip. However, as shown in FIGS. 2A and 2B, the tip of the first protrusion 320 is flat, different from the tip of the protrusion 220 shown in FIGS. 1A and 1B, which comes to a point. The tip of the first protrusion 320 may be configured or shaped to fit into a dimple in a target object, as discussed above.

Different from the scan crutch 200 shown in FIGS. 1A and 1B, the scan crutch 300 shown in FIGS. 2A and 2B includes the second protrusion 330, which extends in the second direction. For example, the first protrusion 320 may extend from an upper surface of the base 310, and the second protrusion may extend from a lower surface of the base 310. The second protrusion 330 is configured to fit into the slot 130 in the scanner 105. For example, in use, a stylus or pointer may be removed from the slot 130 of the scanner 105, and a user may install the scan crutch 300 such that the second protrusion 330 is seated in the slot 130 of the scanner 105. This arrangement may provide relatively easy attachment of the scan crutch 300 to the scanner 105 by utilizing the pre-existing slot 130. The second protrusion 330 may have the same size or a slightly smaller size than a size of the slot 130 such that the second protrusion 330 fits tightly in the slot 130. Further, the second protrusion 330 may be slightly shorter than the slot 130 so that a distal end of the second protrusion 330 does not contact a bottom of the slot 130, ensuring that the base 310 contacts an upper surface of the scanner 105.

As can be seen more clearly in FIG. 2B, the base 310 includes a planar base portion 315 and a sidewall 316 projecting from an edge of (or two edges of) the planar base portion 315. The planar base portion 315 may contact the upper surface of the scanner 105 adjacent the window 120, and the sidewall 316 may contact a side surface of the scanner 105. Together, the planar base portion 315, the sidewall 316, and the second protrusion 330 position the scan crutch 300 on the scanner 105 and ensure a secure connection therebetween. The sidewall 316 may extend from two edges of the planar base portion 315 to prevent rotational movement between the scan crutch 300 and the scanner 105. For example, the planar base portion 315 and the sidewall 316 may form a recessed portion into which a corner of the scanner 105 sits, thereby aligning the scan crutch 300 on the scanner 105 in three directions (e.g., in a height direction and both lateral directions).

The first protrusion 320 and the second protrusion 330 may be offset from each other in a third direction perpendicular to both the first and second directions. For example, the first protrusion 320 may extend from one corner of the planar base portion 315, and the second protrusion 330 may extend from another corner (e.g., an opposite corner) of the planar base portion 315 in the third direction. By offsetting the first and second protrusions 320 and 330, the first protrusion 320 may be located nearer to a center of the scanner 105 than the second protrusion 330 is while the second protrusion 330 extends into the slot 130 at an outer edge of the scanner 105. By locating the first protrusion 320 nearer to the center of the scanner 105, the first protrusion 320 is less likely to be broken or bent during use as force applied to the tip of the first protrusion 320 will be transferred nearer to the center of the scanner 105, reducing a bending moment applied to the first protrusion 320.

Figure 3A:
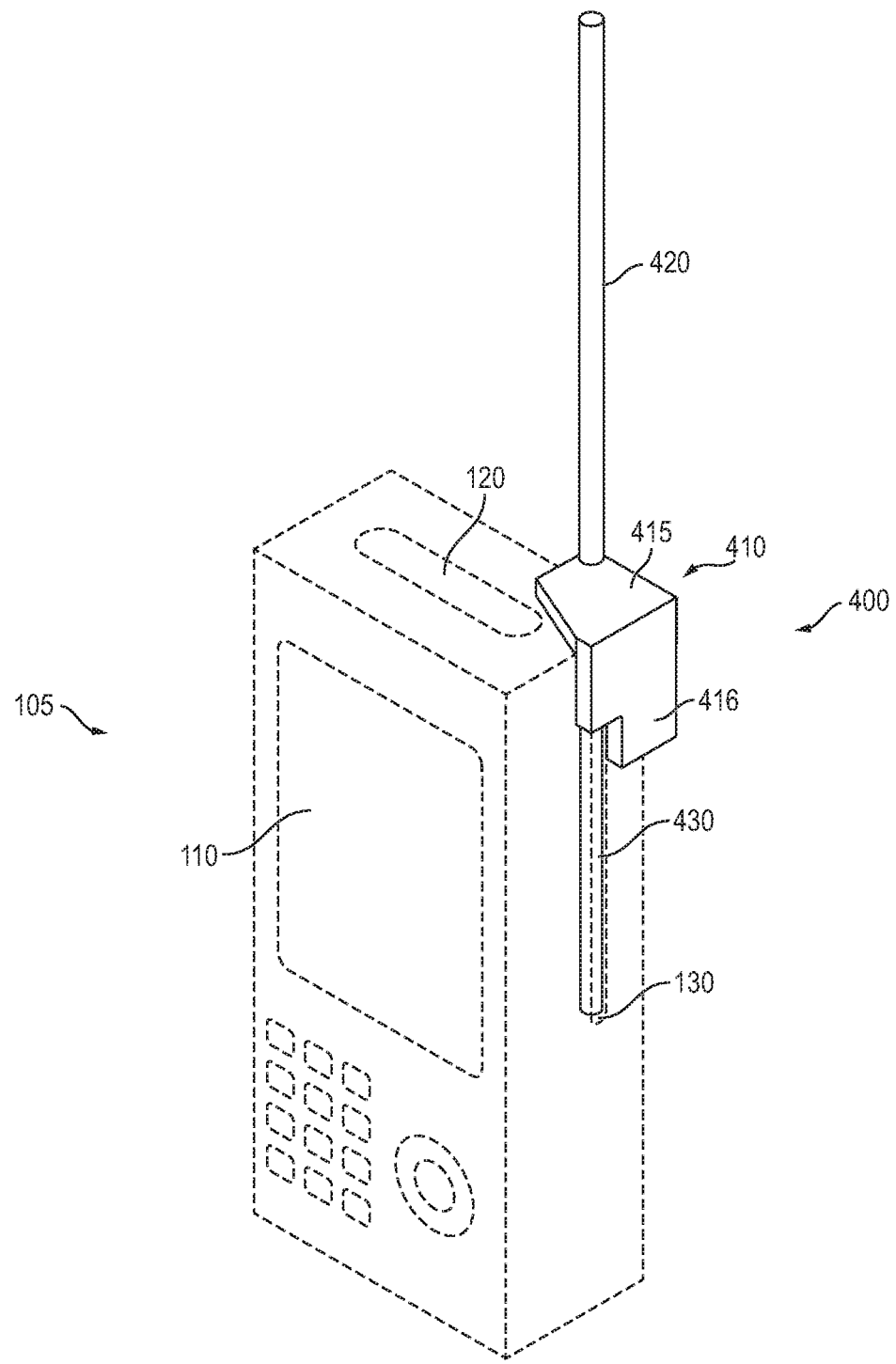
FIG. 3A is a perspective view of a third embodiment of a scan crutch attached to a scanner.
Figure 3B:
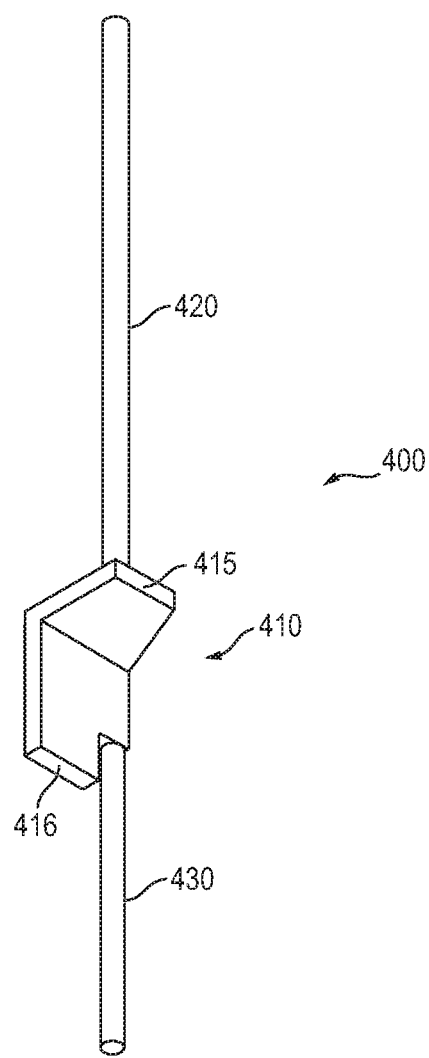
FIG. 3B is another perspective view of the third embodiment of the scan crutch.

FIG. 3A shows a third embodiment of a scan crutch 400 attached to the scanner 105, and FIG. 3B shows another view of the scan crutch 400. The scanner 105 shown in FIG. 3A may be the same as or substantially similar to the scanner 105 shown in FIG. 2A.

The scan crutch 400 shown in FIGS. 3A and 3B includes a base 410, a first protrusion 420 extending from the base 410 in a first direction, and a second protrusion extending from the base 410 in a second direction. The base 410 includes a planar base portion 415 and a sidewall 416 extending from an edge of the planar base portion 415. The first protrusion 420 may be similar to the first protrusion 320 shown in FIGS. 2A and 2B.

Different from the scan crutch 300 shown in FIGS. 2A and 2B, the sidewall 416 may extend from only one edge of the planar base portion 415 and the second protrusion 430 may extend from an end of the sidewall 416 in the second direction. For example, the second protrusion 430 of the scan crutch 400 may be shorter than the second protrusion 330 of the scan crutch 300. However, an overall distance between the planar base portion 415 and a distal end of the second protrusion 430 may be the same or substantially similar to an overall distance between the planar base portion 315 and the distal end of the second protrusion 330.

For example, the sidewall 416 of the scan crutch 400 may extend farther from the planar base portion 415 than the sidewall 316 of the scan crutch 300 extends from the planar base portion 315. The sidewall 416 may be configured to contact features of the scanner 105 along one or more sides thereof. For example, an inner surface of the sidewall 416 may contact the scanner 105 to prevent rotational movement between the scan crutch 400 and the scanner 105. That is, even though the sidewall 416 only extends from one edge of the planar base portion 415 (compared to the sidewall 316 of the embodiment shown in FIGS. 2A and 2B, which extends from two edges of the planar base portion 315 of the scan crutch 300), the sidewall 416 has a relatively large inner surface to come into surface contact with the scanner 105. The scan crutch 400 may be easier to install onto the scanner 105 than the scan crutch 300 because the sidewall 416 may more easily self-locate on the scanner 105 compared with the sidewall 316 that may need to be more carefully located relative to the scanner 105 when the scan crutch 300 is installed thereto.

Similar to the scan crutch 300, the first and second protrusions 420 and 430 of the scan crutch 400 may protrude from opposite corners of the planar base portion 415. For example, the first protrusion 420 may extend from one corner of the planar base portion 415, and the second protrusion 430 may extend from the sidewall 416 at an opposite corner of the planar base portion 415. That is, the first and second protrusions 420 and 430 may be offset from each other in a third direction perpendicular to the first and second directions.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims and their equivalents.

What is claimed is:

1. A scan crutch comprising:
   a base having a planar surface;
   a protrusion extending from the planar surface of the base in a first direction to a distance from the base, the distance being in a range from three inches to five inches; and
   an attachment member extending from the base in a second direction different from the first direction, the attachment member comprising two short side portions and two long side portions forming a rectangular shape with a through-opening in a center of the rectangular shape.

2. The scan crutch of claim 1, wherein the base comprises a first planar base portion and a second planar base portion oriented at a right angle to the first planar base portion,
   wherein the protrusion extends from the first planar base portion, and
   wherein the attachment member extends from the second planar base portion.

3. The scan crutch of claim 2, wherein the second planar base portion is at one edge of the rectangular shape formed by the attachment member, and
   wherein the protrusion is at the one edge of and offset from a center of the rectangular shape formed by the attachment member.

4. A scanning system comprising:
   a scanner comprising a housing, a window in an upper end of the housing, a light emitter/receiver in the housing under the window, and a slot open to the upper end of the housing adjacent the window; and
   a scan crutch configured to be attached to the scanner, the scan crutch comprising:
      a base on the upper end of the housing adjacent the window;
      a first protrusion extending from an upper surface of the base in a first direction away from the scanner; and
      a second protrusion extending from a lower surface of the base in a second direction toward the scanner, the second direction being opposite the first direction, the second protrusion having a smaller width or diameter in a third direction than the base, the third direction being perpendicular to the first and second directions,
   wherein the slot extends in the second direction, and
   wherein the second protrusion is configured to be fitted in the slot.

5. The scanning system of claim 4, wherein the first protrusion is offset from the second protrusion in the third direction.

6. The scanning system of claim 5, wherein the first protrusion is nearer to a center of the scanner than the second protrusion is.

7. The scanning system of claim 4, wherein the base comprises a planar base portion and a sidewall extending from an edge of the planar base portion, and
   wherein the first and second protrusions respectively extend from upper and lower surfaces of the planar base portion.

8. The scanning system of claim 7, wherein both the first and second directions are normal to the upper surface of the planar base portion, and
   wherein the sidewall extends from the planar base portion in the second direction toward the scanner.

9. The scanning system of claim 8, wherein the sidewall of the base contacts a side surface of the scanner.

10. The scanning system of claim 8, wherein the sidewall extends from a plurality of edges of the planar base portion and contacts a corner of the scanner.

11. The scanning system of claim 4, wherein the base comprises a planar base portion and a sidewall extending from an edge of the planar base portion,
    wherein the first protrusion extends from an upper surface of the planar base portion, and
    wherein the second protrusion extends from the sidewall in the second direction.

12. The scanning system of claim 11, wherein the sidewall extends along an entire edge of the planar base portion in the third direction.

13. The scanning system of claim 12, wherein a distal end of the sidewall in the second direction extends beyond a proximal end of the second protrusion in the second direction.

14. A method of scanning a target object by using a scanner and a scan crutch, the scanner comprising a housing, a window in an upper end of the housing, and a light emitter/receiver in the housing and under the window, the scan crutch comprising a base and a protrusion extending from the base, the method comprising:
    removing a stylus from a slot of the scanner;
    attaching the scan crutch to the scanner by inserting a second protrusion of the scan crutch into the slot in the scanner such that the base contacts the upper end of the housing adjacent the window;
    orienting the scanner over the target object such that the window faces the target object; and
    moving the scanner and the scan crutch toward the target object such that a distal end of the protrusion contacts the target object.

15. The method of claim 14, further comprising activating a scanning function of the scanner when the distal end of the protrusion contacts the target object.

16. The method of claim 14, wherein the moving of the scanner and the scan crutch comprises positioning the distal end of the protrusion into a dimple in the target object.

17. The method of claim 14, wherein the attaching of the scan crutch to the scanner further comprises rotating the scan crutch relative to the scanner such that a sidewall protruding from the base toward the scanner contacts a side surface of the housing adjacent the upper end of the housing.

\* \* \* \* \*